United States Patent [19]

Matsuoka et al.

[11] 3,999,780
[45] Dec. 28, 1976

[54] ACTUATOR FOR SAFETY SEAT BELT SYSTEM

[75] Inventors: Hideoki Matsuoka, Kamakura; Shohei Wanibe, Yokosuka, both of Japan

[73] Assignee: Nissan Motor Co., Ltd., Yokohama, Japan

[22] Filed: Feb. 20, 1974

[21] Appl. No.: 443,991

[30] Foreign Application Priority Data

Feb. 22, 1973  Japan .......................... 48-23182

[52] U.S. Cl. .............................................. 280/744
[51] Int. Cl.² ........................................ A63C 9/08
[58] Field of Search ......... 280/150 SB, 150 B, 744, 280/745, 747; 180/82 C; 297/388, 389

[56] References Cited

UNITED STATES PATENTS

| 3,838,746 | 10/1974 | Andres | 280/150 SB |
| 3,871,470 | 3/1975 | Schwanz | 280/150 SB |
| 3,891,271 | 6/1975 | Fieni | 280/150 SB |

*Primary Examiner*—Robert R. Song

[57] ABSTRACT

A cylinder-piston assembly of a gas-operated actuator for straining a seat belt when a vehicle encounters a collision is provided with gas passageways which are normally closed by a valve. The valve permits gas to escape through the passageways when the gas pressure exceeds a predetermined value due to pulling of the piston against the force developed by the gas during forward motion of the seat occupant so that the occupant may be secured to the seat with a restricted force and adequate energy absorption.

1 Claim, 5 Drawing Figures

ACTUATOR FOR SAFETY SEAT BELT SYSTEM

The present invention relates to safety seat belt systems for use in vehicles, and more particularly to an actuator which automatically strains a seat belt during a vehicle collision.

It is fully recognized that the use of seat belts greatly reduces the incidence of serious injuries to passengers in vehicle accidents, particularly in automobile collisions. Passengers, therefore, are recommended and even obliged to wear seat belts properly, or with little slack. However, a long trip with tightly fastened belts gives every passenger almost intolerable pain, and may sometimes lead to an accident caused by driver fatigue. The problem has been partly solved by various safety seat belt systems proposed in recent years which have special mechanisms for automatically straining the belts when an accident happens, permit passengers to wear seat belts in slackened conditions during normal cruising of vehicles. In an example of these systems, a seat belt is strained and made tight practically instantaneously by an actuator, which essentially consists of a cylinder-piston assembly and means for supplying a pressurized gas into the assembly in response to a signal from a collision or shock sensor installed on the vehicle. Such a system is considered effective in securing a seat occupant to the seat at the initial stage of a collision, but it involves a problem too significant to be overlooked. When a seat belt is pulled by the actuator, the tension on the belt or the restraining force on a seat occupant rises so sharply from zero to a high level that the occupant's body is locally compressed by a strong and impulsive force in addition to the inertia force of the occupant. As a result, the safety seat belt itself will inflict severe injuries, even fatal ones in worst cases, upon the occupant although he or she is secured to the seat and prevented from impact with some part of the vehicle. This problem is involved also in conventional manually fastened safety seat belts to a certain degree.

It is therefore an object of the present invention to provide an actuator for a safety seat belt system of a vehicle which strains a seat belt to secure a seat occupant to the seat in a vehicle collision with a restricted force, and absorbing the inertia force of the occupant exerted on the seat belt.

A feature of the present invention is to provide an actuator for straining a seat belt, which is essentially made up of an assembly of a cylinder, a cylinder head and a piston having a rod for connection with the seat belt, and gas supply means, with at least one gas passageway controlled by valve means. When the tension on the seat belt or the tensile force on the piston reaches a predetermined value, the valve means permits gas to flow from within the actuator through the passageway, prohibiting further force intensification and absorbing the kinetic energy of the seat occupant's forward motion by movement of the piston.

An embodiment of the invention will now be described in detail by way of example and with reference to the accompanying drawings, in which.

Figure 1:
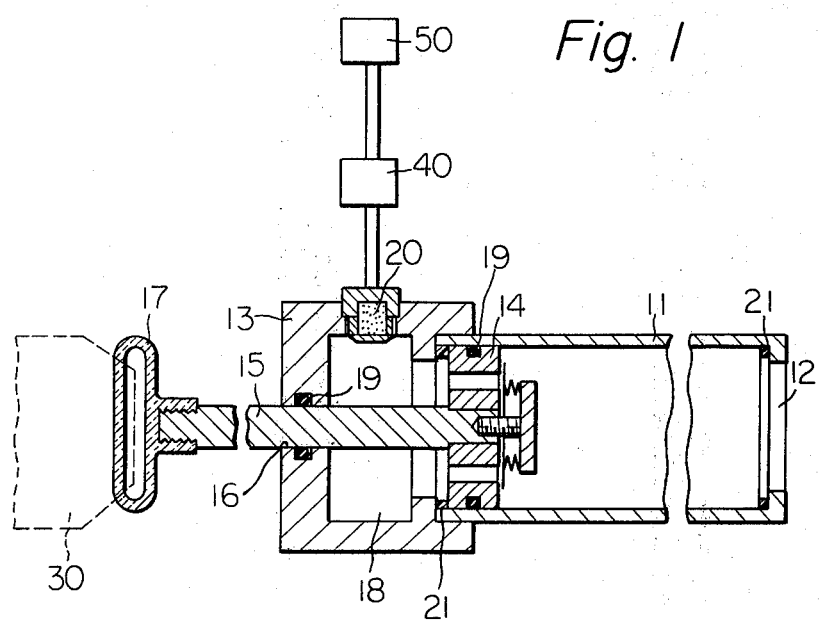
FIG. 1 is a longitudinal sectional view of an actuator embodying the invention connected to a safety seat belt system.

An actuator 10 shown in FIG. 1 includes a cylinder 11 with an open end 12, a cylinder head 13 attached to the other end of the cylinder 11 and a piston 14 slidable within the cylinder 11 having a rod 15 which extends outwardly from the head 13 through an opening 16. A joint member 17 is attached to the protruding end of the rod 15 for connection with an end of a safety seat belt 30. A space or working chamber 18 is formed within the actuator defined by the head 13, a part of the cylinder 11 and the piston 14, and the chamber 18 is made airtight by O-rings 19. A gas generator 20 such as, for example, an electro-explosive unit is airtightly installed protruding at a suitable location through the cylinder head 13 wall and is connected, for example electrically, to a power source 40 which is controlled by a circuit including a collision or shock sensor 50. Bumper members 21 are installed near the ends of the cylinder 11.

Figure 2:
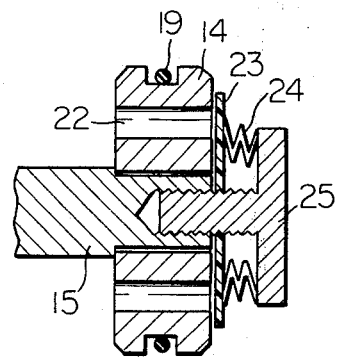
FIG. 2 is an enlarged longitudinal sectional view of a piston of the actuator of FIG. 1.
Figure 3:
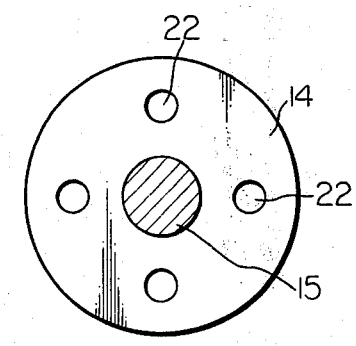
FIG. 3 is a front view of the same piston.

In the embodiment shown in FIG. 1, the piston 14 is provided with gas passageways 22 as shown in FIGS. 2 and 3. A valve disc 23 contacts the surface of the piston 14 facing the open end 12 of the cylinder 11, and is secured to the piston 14 by a clamping member such as a bolt 25 with an interposed resilient member such as a disc spring assembly 24, so that the gas passageways 22 are normally closed. The biasing force on the valve disc 23 can be varied by turning the clamping bolt 25.

Figure 4:
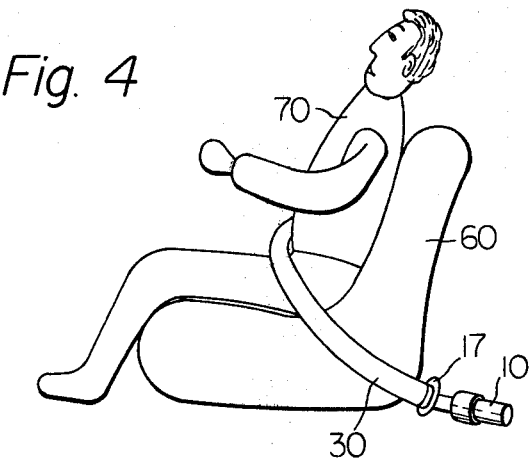
FIG. 4 is a schematic view illustrating an example of a seat belt installation with an actuator of the invention.

The actuator 10 of FIG. 1 is fixed to a suitable part of a vehicle body or a seat frame. Usually an end of the seat belt 30, preferably a low-extension seat belt 30, is joined to the actuator 10 by means of the joint member 17 as shown in FIG. 4. A passenger 70 on a seat 60 wears the seat belt 30 loosely enough to be relaxed physically and/or mentally during normal operation of the vehicle.

When a vehicle collision occurs, the gas generator 20 is energized from the power source 40 in response to a signal from the shock sensor 50. The generated gas fills the working chamber 18 and raises the chamber pressure high enough to move the piston 14 within about 10 ms from the instant of collision. Consequently, a strong and rapid pull is given to the seat belt 30. Thus, the seat belt 30 is automatically strained so that the seat occupant can be secured to the seat before beginning to move relative to the seat.

Then the occupant is forced to move forward by his own inertia due to a large deceleration of the vehicle, and the force is exerted on the seat belt 30. At this stage, contrary to the initial stage, the seat belt 30 begins to pull the piston 14 against force developed by the gas pressure. When the gas is compressed to such a degree that the force exerted on the valve disc 23 exceeds the biasing force of the spring assembly 24, the valve disc 23 is forced to move and permits gas to flow from within the chamber 18 through the passageways 22 to the atmosphere. Due to the gas discharge, the piston 14 can move gradually toward the cylinder head 13 without further increase in the force exerted on the piston 14 or the seat belt 30. Thus, a considerable amount of the kinetic energy of the occupant's forward motion is absorbed by displacement of the piston 14.

The biasing force $F_2$ of the spring assembly 24 is adjusted so that it may be larger than a force $F_1$ exerted on the valve disc 23 during the initial gas expansion stage, and below a critical value for a human body. Therefore, the initial straining of the seat belt 30 is accomplished without any decrease in the efficiency of the generated gas irrespective of the gas passageways 22. The force $F_2$ is determined depending on the design of the total seat belt system and the weight of the seat occupant, and can be easily adjusted, for example in this embodiment, by turning the clamping bolt 25 even after installation of the actuator in a vehicle.

It will be understood that the location of the gas passageways 22, the valve disc 23, etc., is not limited to the piston 14 as exemplified in the above described embodiment. The cylinder head 13 and/or the peripheral wall of the cylinder 11 near the head 13 may be provided with the passageways 22 etc. in lieu of or together with the piston 14.

Figure 5:
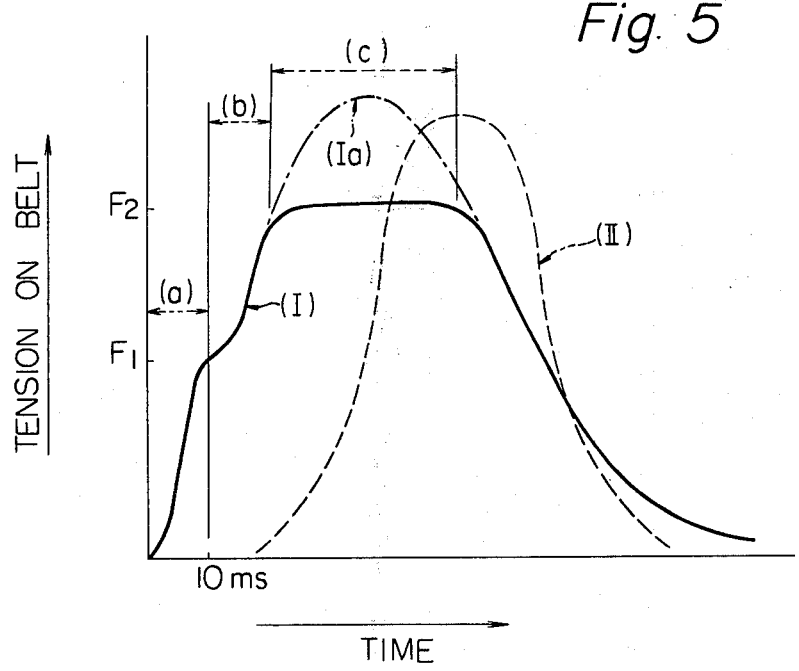
FIG. 5 is a graph showing the variation of tension on the seat belt as a function of time measured from the instant of a collision.

In FIG. 5 is shown the variation in the tension of a seat belt with respect to time measured from the instant of collision, where curves (I) and (II) represent cases in which an actuator of the invention is used and in which a conventional seat belt with no straining mechanism is used, respectively. The belt is strained rapidly by the gas pressure in a region (a) of the curve (I), opposes the inertia force of the seat occupant in the region (b) until the force reaches $F_2$, and then gas discharge begins through the passageways 22 and returning movement of the piston 14. As a result, the tension on the belt is maintained at $F_2$ as shown in the region (c) until the load from the occupant begins to decrease.

If the actuator is not provided with passageways 22, the tension on the belt continues to increase above $F_2$ as shown by a curve ($Ia$).

A similar large force is exerted also on a conventional seat belt which has been fastened tightly in advance, because the load of the occupant is substantially supported only by the belt itself.

It is necessary, from the viewpoint of the energy or shock absorption effect of a safety seat belt system, to consider the amount of displacement in the system with exerted loads. In conventional seat belt system, the displacement depends only on the extension of the belt, which is generally restricted not to exceed about 30% of the original length. In a system including an actuator of the invention, the displacement in the system is increased due to the returning movement of the piston 14 in addition to the belt extension. Therefore, the amount of kinetic energy absorption in this system, which may be expressed by the integral of the displacement in the system with respect to the load on the belt, is considerably larger than in conventional systems despite a reduced peak force on the belt. Besides, the increased energy absorption is accomplished in a relatively long time without imposing a severe shock on the seat occupant.

As seen from the above detailed description, an actuator of the invention, when used in a safety seat belt system for a vehicle, works to automatically secure a seat occupant to the seat at the initial stage of a vehicle collision and to effectively absorb kinetic energy of the occupant's forward motion during the subsequent stage without exerting an excessive and impulsive force on the occupant. The seat occupant, therefore, can be protected against injuries both from the so-called "second collision" and by an impulsive compression force of the strained seat belt. An actuator of the invention is advantageous also in that the tension and/or shock on the seat belt anchorage point of a vehicle body can be reduced, resulting in an increase in the reliability of the seat belt system.

It will be apparent that an actuator of the invention can be applied not only to a seat belt system which employs a lap belt as shown in FIG. 4, but also to one which employs a shoulder-type seat belt.

What is claimed is:

1. In a safety seat belt system for a vehicle, an actuator for straining a safety seat belt during a collision of the vehicle comprising:
   a. a cylinder;
   b. a cylinder head fixed to said cylinder at one end thereof;
   c. a piston slidable within said cylinder and having a rod extending outwardly therefrom through said cylinder head for connection with one end of the safety seat belt;
   d. a working chamber defined by said cylinder, cylinder head and piston;
   e. means operative to supply a gas under pressure into said working chamber when the vehicle encounters a collision; and
   f. at least one gas passageway which is arranged to connect said working chamber to the atmosphere through at least one of said piston, cylinder head and the peripheral wall of said cylinder, and is provided with valve means which are adjustable to normally close said gas passageway and permit at least a portion of said gas under pressure to be released from said working chamber through said gas passageway when a force greater than a predetermined value is exerted on said valve means, wherein said gas passageway is arranged through said piston, and wherein said valve means comprises a valve disc, a resilient member contacting a surface of said valve disc, and a clamping member to attach said valve disc and resilient member to said piston, said clamping member compressing said resilient member to cause said valve disc to close said gas passageway with a force of said predetermined value.

* * * * *